US008920098B2

(12) United States Patent
Hänel

(10) Patent No.: US 8,920,098 B2
(45) Date of Patent: Dec. 30, 2014

(54) STORAGE RACK HAVING TRANSPORT DEVICE

(75) Inventor: Joachim Hänel, Bad Friedrichshall (DE)

(73) Assignee: Hänel & Co., Altseätten (CH)

( * ) Notice: Subject to any disclaimer, the term of this patent is extended or adjusted under 35 U.S.C. 154(b) by 0 days.

(21) Appl. No.: 12/675,328

(22) PCT Filed: Aug. 28, 2008

(86) PCT No.: PCT/EP2008/061320
§ 371 (c)(1),
(2), (4) Date: Feb. 25, 2010

(87) PCT Pub. No.: WO2009/027479
PCT Pub. Date: Mar. 5, 2009

(65) Prior Publication Data
US 2010/0307989 A1    Dec. 9, 2010

(30) Foreign Application Priority Data
Aug. 29, 2007    (DE) .......................... 10 2007 040 863

(51) Int. Cl.
*B65G 1/04*    (2006.01)
(52) U.S. Cl.
CPC .......... *B65G 1/0407* (2013.01); *B65G 2207/30* (2013.01)
USPC ....................................... 414/280
(58) Field of Classification Search
CPC .......................... B65G 1/0407; B65G 1/0435
USPC .......................... 414/267, 277, 280
See application file for complete search history.

(56) References Cited

U.S. PATENT DOCUMENTS 3,492,704 A * 2/1970 Schwellenbach ............. 425/162
3,746,189 A * 7/1973 Burch et al. .................. 414/273
(Continued)

FOREIGN PATENT DOCUMENTS

CN    1891582 C    11/2007
DE    19513179 C2    2/1997
(Continued)

OTHER PUBLICATIONS

European Patent Office, International Search Report for PCT/EP2008/061320, dated Nov. 18, 2008, 3 pages.
(Continued)

*Primary Examiner* — Jonathan Snelting
(74) *Attorney, Agent, or Firm* — Brian B. Shaw, Esq.; Thomas B. Ryan; Harter Secrest & Emery LLP

(57) ABSTRACT

A storage rack includes a plurality of rack units with container supports spaced one above the other, the supports being disposed in pairs on opposite side walls of the rack units to form storage locations for containers. The containers can be placed in or removed from the storage locations by means of a controllable transport device. The transport device has at least one first transport means and one second transport means, the first transport means is able to move in the vertical direction (Z), and the second transport means is supported on the first transport means and is able to move in a first horizontal direction (X) relative to the first transport means. A transfer device for handling a number of containers is arranged on the second transport means and includes a number of transfer units for placing the containers into and removing them from stock, each transfer unit can be associated with one container and each transfer unit can be controlled and moved separately.

16 Claims, 6 Drawing Sheets

(56) References Cited

U.S. PATENT DOCUMENTS

Figure 1:
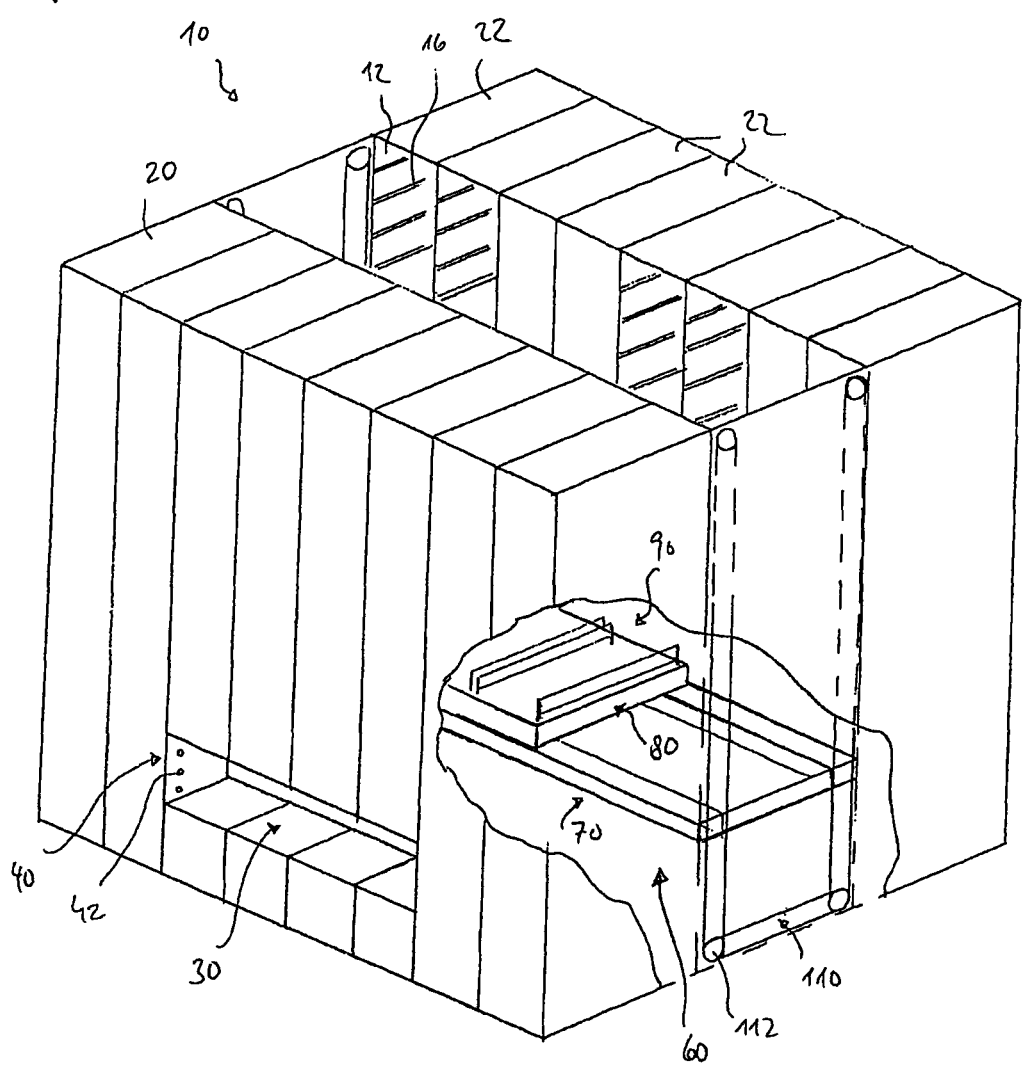

| | | | | |
|---|---|---|---|---|
| 3,792,758 | A | * | 2/1974 | Wentz .................... 187/236 |
| 4,724,640 | A | * | 2/1988 | Patane .................... 52/234 |
| 5,043,962 | A | * | 8/1991 | Wanger et al. ........ 369/30.48 |
| 5,104,277 | A | * | 4/1992 | Bullock .................. 414/280 |
| 5,149,240 | A | * | 9/1992 | Di Rosa .................. 414/277 |
| 5,599,154 | A | * | 2/1997 | Holscher et al. ........ 414/278 |
| 5,833,427 | A | | 11/1998 | Siegler et al. |
| 6,024,425 | A | * | 2/2000 | Imai et al. ................ 312/35 |
| 6,216,890 | B1 | * | 4/2001 | Rathmer ................. 211/175 |
| 6,386,116 | B1 | * | 5/2002 | Ostwald ................. 104/287 |
| 6,564,290 | B1 | * | 5/2003 | Lechner .................. 711/111 |
| 7,387,485 | B2 | * | 6/2008 | Dickey et al. ........... 414/277 |
| 8,113,758 | B2 | | 2/2012 | Haenel |
| 8,579,574 | B2 | | 11/2013 | Haenel |
| 2003/0185656 | A1 | * | 10/2003 | Hansl ..................... 414/277 |
| 2006/0087927 | A1 | * | 4/2006 | Sasaki .................. 369/30.27 |
| 2007/0065258 | A1 | * | 3/2007 | Benedict et al. ........ 414/266 |
| 2007/0134077 | A1 | | 6/2007 | Laurin et al. |
| 2007/0140817 | A1 | * | 6/2007 | Hansl ..................... 414/277 |
| 2008/0279669 | A1 | | 11/2008 | Hanel |

FOREIGN PATENT DOCUMENTS

| | | |
|---|---|---|
| DE | 4220116 C2 | 7/2003 |
| DE | 20305123 U1 | 6/2004 |
| DE | 202005017269 U1 | 2/2006 |
| DE | 102004042061 A1 | 3/2006 |
| DE | 202007003084 U1 | 5/2007 |
| DE | 102005048379 B4 | 8/2009 |
| EP | 0553470 A1 | 8/1993 |
| EP | 1741644 A1 | 10/2007 |
| FR | 2686327 A2 | 7/1993 |
| JP | H02158501 A | 6/1990 |
| JP | H10320601 A | 12/1998 |
| JP | 2002356205 A | 12/2002 |
| JP | 2002356207 A | 12/2002 |
| JP | 2004083250 A | 3/2004 |
| WO | 99/43234 A1 | 9/1999 |
| WO | 2007042381 A | 4/2007 |

OTHER PUBLICATIONS

PCT—Notification of Transmittal of Translation of the International Preliminary Report on Patentability; dated May 14, 2010 (7 pages).

* cited by examiner

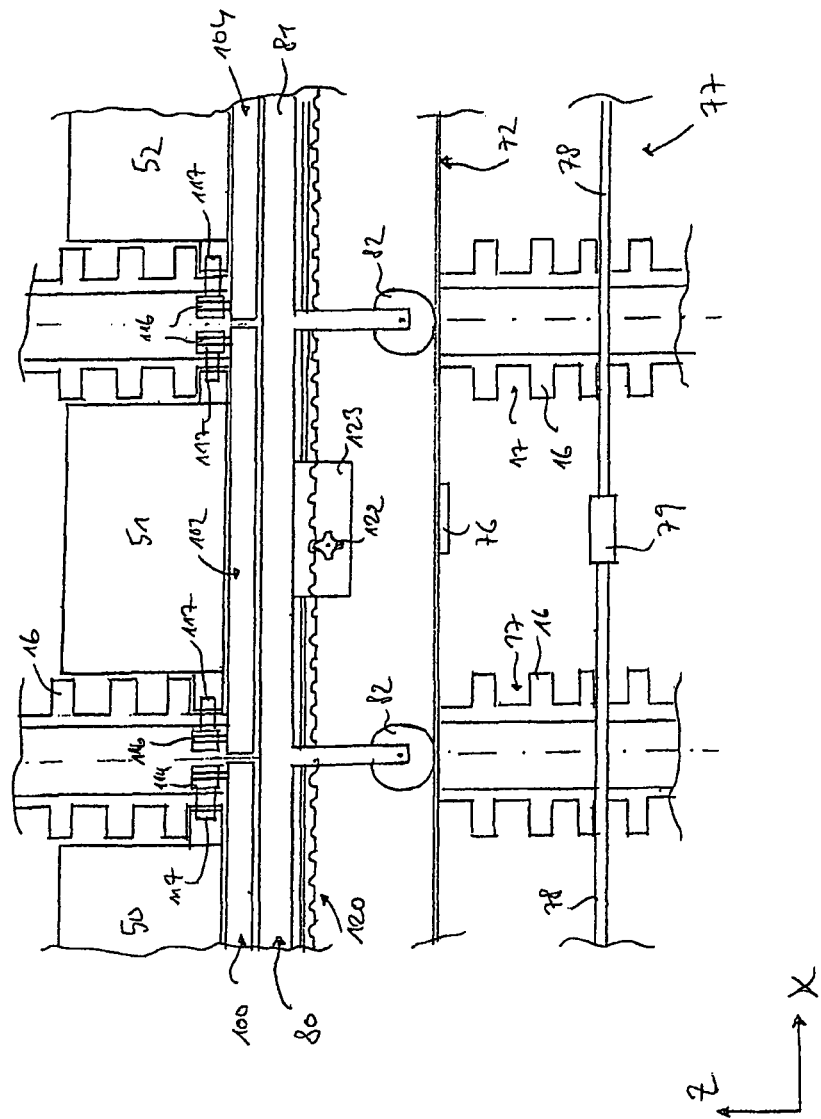

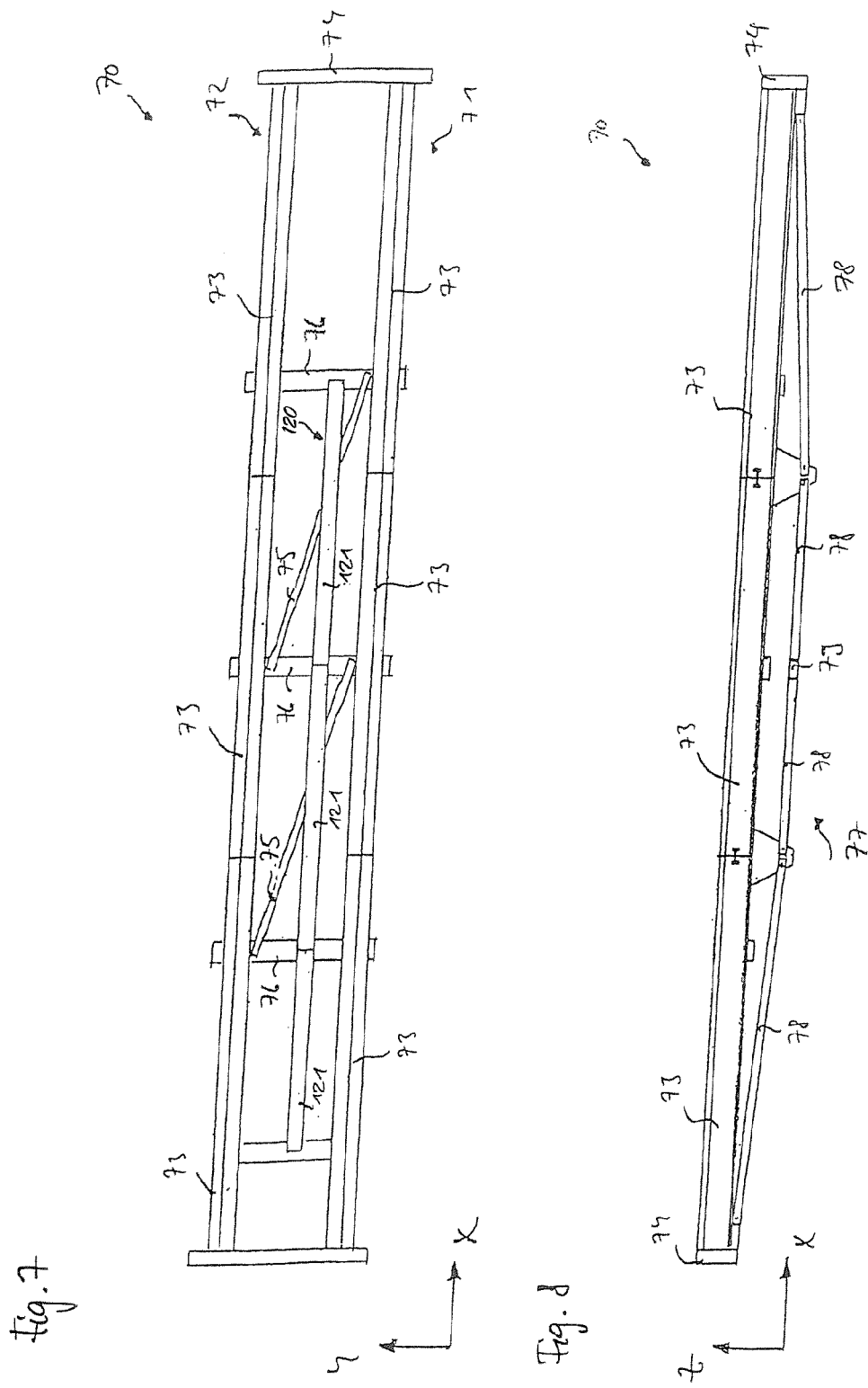

STORAGE RACK HAVING TRANSPORT DEVICE

The present invention relates to a storage rack having a plurality of rack units with container supports spaced one above the other, said supports being disposed in pairs on opposite side walls of the rack units to form storage locations for containers. These containers can be placed in or removed from the storage locations by means of a controllable transport device. The transport device has at least one first transport means and one second transport means, wherein the first transport means is able to move in the vertical direction, and the second transport means is supported on the first transport means and is able to move in a first horizontal direction relative to the first transport means.

A storage rack of this kind is known from DE 10 2005 048 379 A1. This storage rack can easily be adapted to changed spatial conditions. This is possible in particular because the first transport means structured in a modular way can subsequently be extended or reduced and, accordingly, the rack units can be adapted to the storage rack. The second transport means movable in a horizontal direction is correspondingly fitted to place a stored-goods carrier in the desired storage space between two side walls or to remove it from this storage space.

Furthermore, a storage and retrieval device movable by means of a lifting carriage with which a number of containers can be placed in and removed from storage is known from DE 42 20 116 C2. A complicated construction of belts, counteracting battens and slides is necessary to move the containers.

In particular among such so-called small component stores, there is frequently the problem that a variety of small component parts are required in rapid succession and these components are each stored in different containers in different locations within the storage rack. Accordingly, as a rule, numerous transport operations are necessary one after the other in order to deliver the different containers with the required components at the operating hatch of the storage rack. Furthermore, the movable transport devices within the storage rack are often of a complicated construction and are unalterably integrated into the storage rack. These transport devices are in most cases designed for use only with the corresponding types of storage rack.

The invention focuses on the problem of providing a storage rack which reduces the access times for the placing and removing of the containers but also provides a storage rack that is able to be adapted to changing spatial conditions.

The solution to this problem lies in a storage rack with the features mentioned at the outset in accordance with patent claim 1 of this invention characterised by a transfer device for handling a number of containers wherein the transfer device is disposed on the second transport means and comprises a number of transfer units for placing and removing containers. Each transfer unit can also be associated with a container and each transfer unit can be controlled and moved separately.

The storage rack according to the invention is based on the concept of constructing a transfer device with a number of transfer units for the handling of a number of containers so that a number of containers can be served preferably simultaneously and/or in neighbouring storage spaces. In a preferred embodiment it is possible to put in store and to remove several containers, in particular four, simultaneously. In this way the access times for the gathering of small components stored in the containers are reduced.

The storage rack according to the invention distinguishes itself in particular by the fact that faster access times can be achieved by the placing and removal of several containers, i.e. owing to shorter placing and removal times. In particular several containers can be placed or removed at the same time. Furthermore, the containers can be moved without supplementary carriers, and containers of different heights can be used, too.

In the framework of the present invention, the term "container" is to be understood as a carrier for stored goods which can support and store the goods. For example, the container can be a receptacle or a stored-goods carrier. Different types of containers can be placed in the storage rack, for example with different dimensions and, in particular, of different heights.

The present invention is preferably to be used as a fully automated small-component store.

Advantageous embodiments of the storage rack according to the invention are claimed in the independent claims.

In one preferred embodiment the transfer device is made up of a number of transfer units that can be detached from or connected to one another in a modular fashion, and the number of transfer units can be varied depending on the number of rack units.

It is further of advantage when, additionally or alternatively, the first transport means is made up of a number of detachable transport-means modules connected to one another, the number of which is variable depending on the number of rack units.

It is also advantageous if the number of transfer units is variable depending on the number of rack units and/or depending on the number of transport-means modules.

In another preferred embodiment the transfer units are constructed as gripping units and/or pulling units. In this way, the corresponding gripping or pulling means can be moved by one or more drive means. For example, one drive can propel several of these means so that the containers to be placed in store or to be removed can be moved in parallel from the storage position to the second transport means or vice versa.

In an advantageous embodiment the transfer unit is configured and arranged in such a way that the containers in question can be moved in a second horizontal direction which is essentially perpendicular to the first horizontal direction. Preferably this second horizontal direction corresponds to a direction transverse to the transport shaft between two rack rows.

It is an advantage for the transfer units to be arranged so that they place or remove the containers at least in groups synchronously or successively. In this way, with a transfer device having for example four transfer units, in a first step a group of two containers stored in neighbouring storage positions can be removed simultaneously from the storage positions onto the second transport means and, in a corresponding second step, a second group of two further containers at a different height in the storage rack can also be moved synchronously from the neighbouring storage locations onto the second transport means.

It is advantageous to provide four transfer units that are preferably configured as gripping units which, for example, move four containers in neighbouring storage positions on the same storage level synchronously onto the second transport means or vice versa.

In an advantageous embodiment the storage rack comprises at least one operating hatch for submitting and retrieving containers. But several hatches could be provided. It is beneficial to have height-measuring equipment to measure the height of containers in the vicinity of the operating hatch. The height-measuring equipment can ascertain the number of height units necessary for the storage of a container in a specific storage unit. Thus the measurement signal of the height-measuring equipment can be communicated to the control unit of the transport device which, depending on the occupancy of the storage racks and the height of the container, can transport the container to a suitable storage position.

In addition, in the event that there are a number of containers in the operating hatch, the height-measuring equipment can establish the height of the tallest container. To do this a number of measuring devices can also be used. Then the control unit can identify a neighbouring area of the storage rack where there are a number of storage places corresponding to the number of containers, and of these at least one place with sufficient storage-position height to accommodate the tallest of the containers. Subsequently, all the containers placed at the operating hatch can be moved simultaneously in one single transfer movement to the neighbouring storage positions identified.

In other embodiments again a number of height-measuring devices can be provided enabling the height of each individual container in the area of the operating hatch to be measured. It is also possible to move several containers of different heights to an area of the storage rack offering storage places where the individual heights of the neighbouring storage places are sufficient to permit the individual containers to be placed in these neighbouring positions.

In a preferred embodiment, the operating hatch is dimensioned in such a way that all the containers can be removed and/or placed into store at the same time. If the storage rack has to be extended or reduced by the addition or removal of rack units, the size of the operating hatch can also be varied appropriately. This change can also be coordinated with the number of transfer units and/or the number of transport-means modules. In this way it is possible to obtain a storage-rack kit for assembly in which the storage rack units, operating hatch, transport device, in particular the modules of the first and/or the second transport means, and the transfer units can be matched to one another.

To achieve an intermittent opening and closing of the operating hatch in a preferred embodiment, for example, a shutter device—in particular a high-speed door—can be provided in the operating hatch area. Such a device prevents dirt from getting into the storage rack via the operating hatch. A high-speed door of this kind can for example be positioned at the inner end of the operating hatch so that after an operating movement the removed containers are still positioned in the operating hatch and can be further processed by the operator, yet the shutter device is already closed.

It is advantageous for the container supports to be in a grid-like array on the side walls. By the prescription of a specific grid size and registration of this grid in the control unit of the transport device, it is possible in conjunction with the above-mentioned height-measuring equipment to allocate a storage position suitable for a specific height of container. It is advantageous for the container supports to be pressed into the side walls in meandering pattern. The side walls are made of steel sheet and are appropriately welded to vertical stanchions. It is also beneficial if the container supports are provided with grooves into which the containers' support bars can be inserted and removed. Support bars of this kind can be attached to the side walls of the containers, preferably towards the bottom. It has proved particularly advantageous to have a grid of 25 mm.

In a further preferred embodiment, the first transport means, the second transport means, and/or the transfer units and the transfer device are movable by means of a rack and pinion drive and/or a chain drive. With regard to the precise configuration of these drives, reference is made to DE 10 2005 048 379 A1.

The invention will now be further explained with reference to the drawings.

Figure 2:
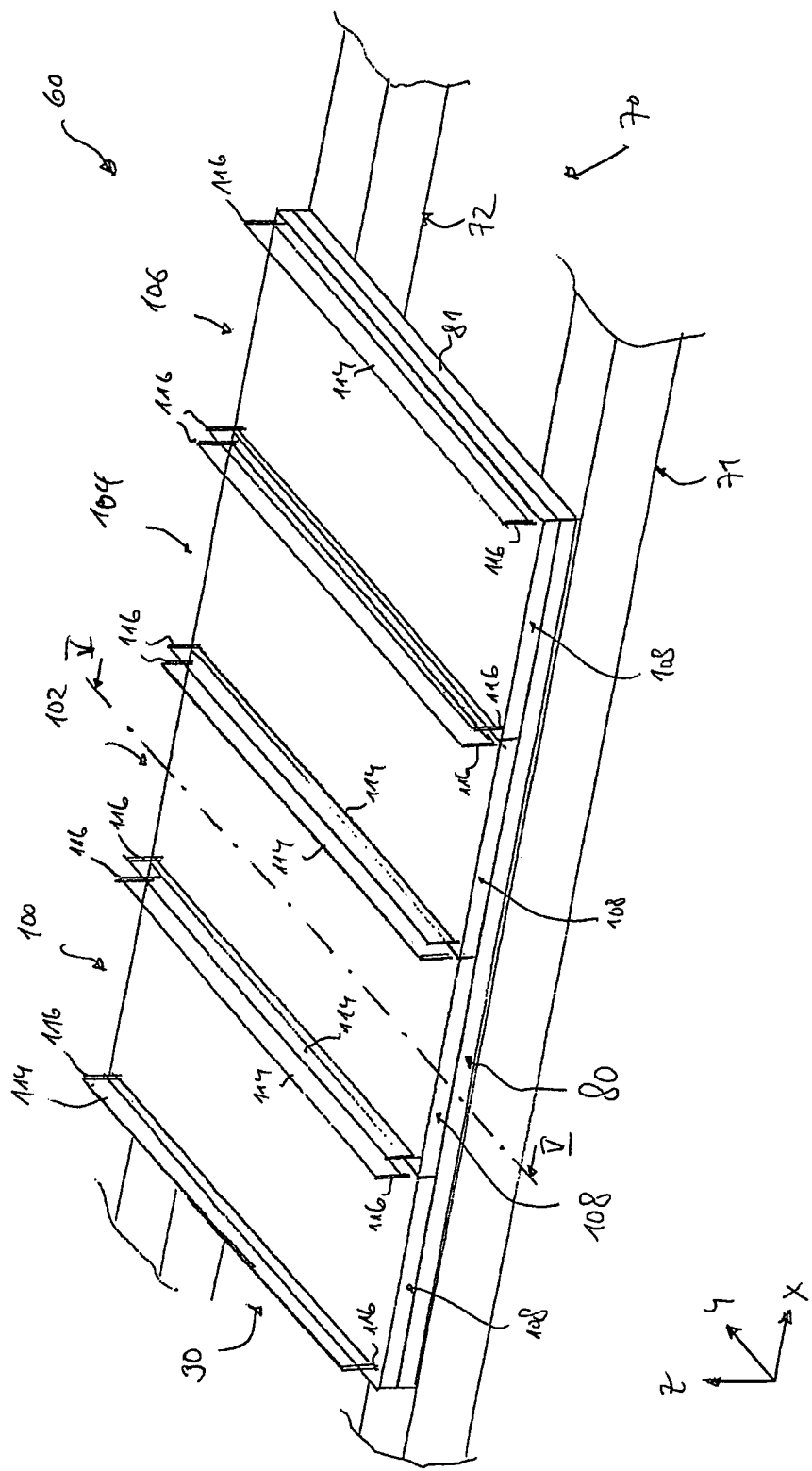
Figure 3:
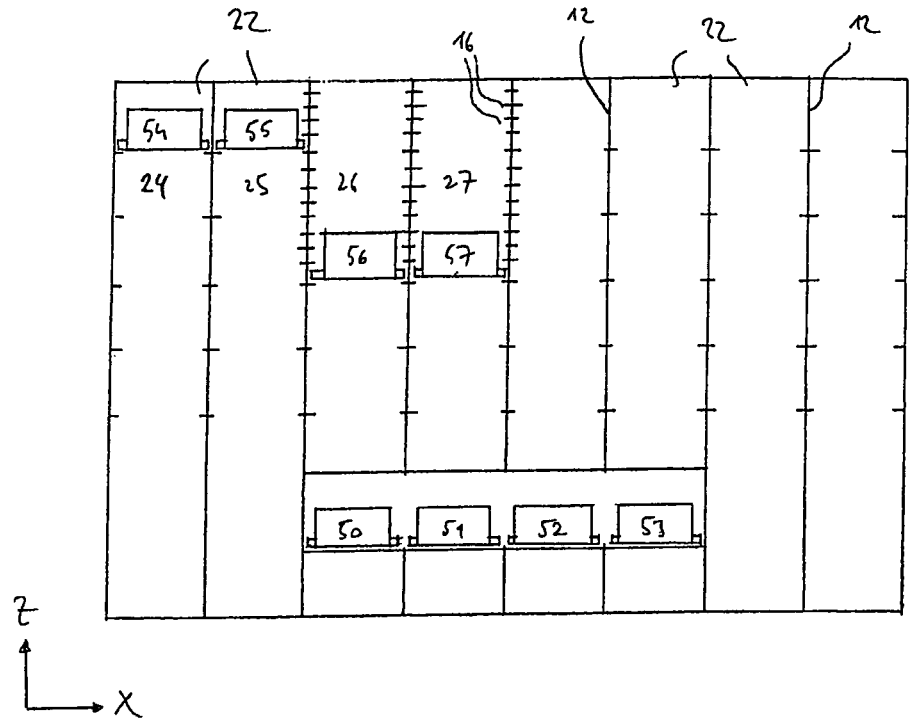
Figure 4:
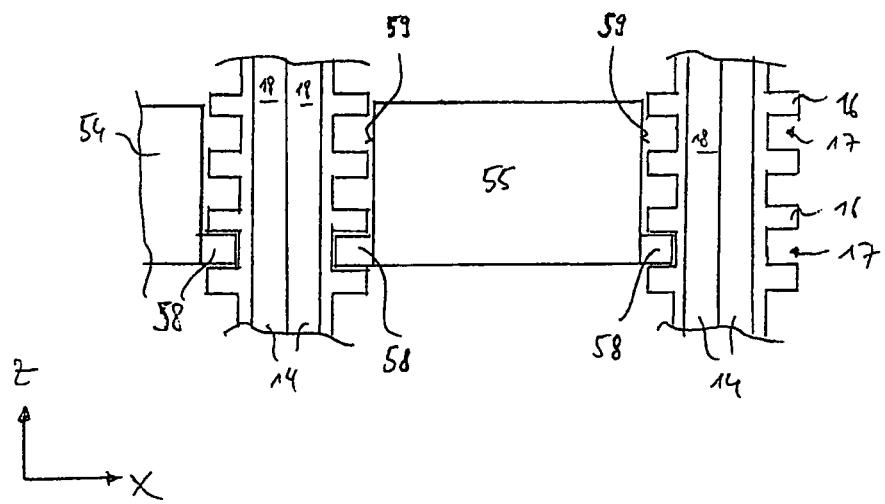

These present in schematic form:

FIG. 1 a perspective view of the storage rack according to the invention with a transport device;

FIG. 2 a perspective view of the transport device, corresponding to the cutout FIG. 1, in enlarged scale;

FIG. 3 a view of the storage rack with outline presentation of the container supports and the containers to be stored and removed;

FIG. 4 an extract from FIG. 3 in enlarged scale

Figure 5:
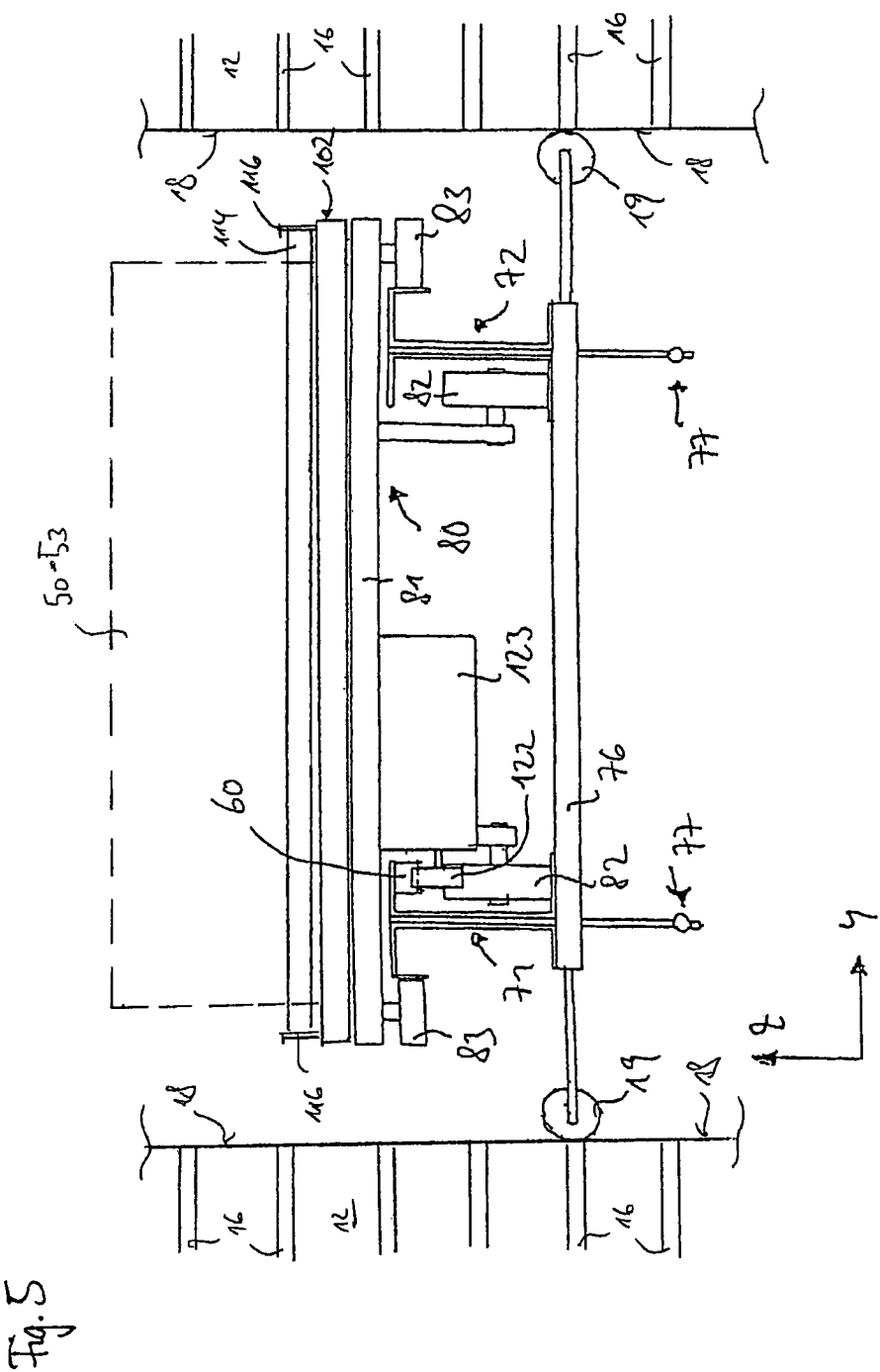

FIG. 5 a cross-section through the transport device along the line V-V in FIG. 2;

FIG. 6 a longitudinal cross-section through the transport device;

FIG. 7 a view of the first transport means from above, and

FIG. 8 a side view of the first transport means.

FIG. 1 shows the schematic structure of a storage rack 10 according to the invention in the form of a small component store with sixteen rack units 20, 22, in which eight rack units 20 are arranged next to each other in a first row, and eight rack units 22 are arranged next to each other in a second row. In the space between these two rack units there is a transport device 60, for placing into and retrieving containers from stock, arranged in a movable way in a transport shaft. In the present embodiment, for example, four containers to be placed into stock 50, 51, 52, 53, and four containers to be retrieved 54, 55, 56, 57, are being handled (see FIG. 2). It is possible, however, to handle a different number of containers.

In order to be able to store the incoming containers 50 to 53 in suitable storage locations or to retrieve them, the rack units 20, 22 have side walls 12 with vertically positions stanchions 14 with pairs of container supports 16 located opposite each other (see FIGS. 3, 4). The side walls made of steel sheet are each welded to the stanchions 14. On two opposite sides 59 of each container there is a support bar 58 which supports the container in the two corresponding container supports 16.

As can be seen in FIG. 4, the container supports 16 are integrated into the corresponding side walls 12 and are pressed into the wall in a meandering pattern. This ensures that a comparatively stiff structure is given to the side walls 12. To facilitate the easy introduction of the containers 50 to 53 into the storage spaces 24 to 27, the container supports 16 have a tapering cross-section on the side facing in the transport direction 60. A groove 17 is formed between each set of two neighbouring container supports 16 protruding from the side wall 12 which accommodates the support bar 58 of a container.

FIG. 1 also shows an operating hatch 30 which enables the containers 50 to 53 to be loaded into the storage rack 10 or the containers 54 to 57 to be removed from the storage rack 10. To achieve optimal use of the storage space, a height-measuring device 40 for measuring the height of the containers 54 to 57 is provided in the area of the operating hatch 30. The height-measuring device 40 is fitted with a number of photoelectric beams 42 at a distance from each other corresponding to the distance between the container supports 16 in the rack so that the number of height units necessary to store the containers 50 to 57 can be ascertained. A control unit establishes the necessary storage height for the individual containers 50 to 57 and preferably identifies a number of neighbouring storage spaces 24 to 27 so that the number of containers 50 to 53 can be simultaneously sent to suitable storage spaces.

The controllable transport device 60 is configured for the placing and removing of containers 50 to 57 so that the containers 50 to 57 can be transported in a first spatial direction Z, in a second spatial direction X and a third spatial direction Y. In the embodiment presented, the three spatial directions X, Y, Z are perpendicular to each other. Hereinafter the spatial direction Z will be described as the vertical direction, the spatial direction X as the longitudinal direction and the spatial direction Y will be described as the transverse direction (see FIG. 1).

In order to facilitate the movement of the containers 50 to 57 in the vertical, longitudinal and transverse directions, the transport device 60 comprises a first transport means 70 and a second transport means 80 as well as a transfer device 90 (see in particular FIGS. 1, 2 and 6).

The first transport means 70 is constructed like a lifting platform, movable in the vertical direction Z by means of a drive, and it has two carriers 71, 72, arranged parallel to each other. As FIGS. 7 and 8 show, each carrier 71, 72, is assembled from a multiple of carrier modules 73 bolted together. This provides a construction of the carrier module 73 which can be dismantled.

The first transport means 70 has two pre-tensioning elements 77 which extend below the underside of the carriers 71, 72. Each pre-tensioning element 77 has four pre-tensioning modules 78 in the form of tie rods. In the middle section of the pre-tensioning element 77 there is a tensioner 79 for regulating the tension generated by the pre-tensioning element 77. The adjustment of the tension can also be made additionally or alternatively in the end area of the end module of the pre-tensioning element 77. In the middle section, the pre-tensioning element 77 is at a distance from the carriers 71, 72. Thus, as a result of the leverage arm, a torque can be produced which counteracts the torque generated by the weight of the transport device 60 and the containers 50 to 57. This leads to a reduction of the bending of the carriers 71, 72, and enables the carriers 71, 72 to accept greater loads in comparison to a carrier without a pre-tensioning element 77.

In the assembly of the carriers 71, 72, the individual carrier modules 73 are bolted to each other. On the underside of the carrier 71, 72, at each of the connection points to the carrier module 73, a connecting arm is attached at the end of which the pre-tensioning element 77 is fastened at a distance from the carriers 71, 72. The first transport means 70 is also provided with two stiffening elements 75 arranged obliquely and two transverse carriers 74 at the ends of the carriers 71, 72 (see FIGS. 7, 8).

From FIG. 1 it can also be seen that the first transport means 70 is equipped with a drive having a total of four chain drives each with one chain 110 and two drive shafts 112 which project horizontally from a drive motor (not shown in figure). To enable adaptation to different lengths of the storage rack 10, drive shafts 112 of different lengths are used.

To prevent the carriers 71, 72 from swinging in the transverse direction Y while the first transport means 70 is moving, a number of wheels 19 are provided on the transverse carriers 71, 72 and on the strut 76 which are supported on the vertical stanchions of the rack units 20, 22.

As can be seen in particular from FIGS. 5 and 6, the second transport means 80 has a chassis 81 as well as a number of wheels 82. This enables the second transport means 80 to be moved in the longitudinal direction X between the two rack units 20, 22. To achieve this movement, a rack and pinion drive can be provided which drives the wheels 82 supported on the first transport means 70.

The rack and pinion drive comprises a toothed rack 120 made up of a number of toothed-rack modules 121, a pinion 122 which engages with the toothed rack 120, and a motor 123 for driving the pinion 122. As the toothed rack 120 is of a modular construction, it can also be adapted to suit the different lengths of the first transport means 70. The toothed-rack modules 121 are positioned on the struts 76 of the first transport means 70. The pinion 122 and the motor 123 are disposed on the chassis 81 in such a way that the teeth of the pinion 122 can engage with the teeth of the toothed rack 120 immediately (see FIG. 6).

Movement of the second transport means 80 is guided on the one hand by wheels 82 which travel along a flange of the carrier 71, 72. Additional wheels 83 engage with vertically oriented flanges of the carriers 71, 72 and serve to guide the side of chassis 81 on the carriers 71, 72.

In the present embodiment the transfer device 90 provided on the transport device 60 comprises, for example, four transfer units 100, 102, 104 and 106 for handling the containers 50 to 57. A procedure for placing the containers 50 to 53 in store with the help of these four transfer units, 100 to 106, will now be described corresponding to the situation in FIG. 3 with the four containers 50, 51, 52 and 53 positioned near the operating hatch 30 which are to be placed into stock.

After the containers 50 to 53 have been positioned in the operating hatch 30, the height-measuring device 40 establishes the height of all the containers 50 to 53. In the present case all four containers have the same height. Subsequently, the control unit ascertains an area in one of the rack units 20, 22 in which there are preferably four neighbouring spaces available. In this case, for example, the storage spaces 24, 25, 26 and 27 in rack unit 22 are identified (see FIG. 3).

The transfer device 90 is set up so that each one of the transfer units 100 to 106 can be associated with one of the containers 50 to 53. In the present case, each of the four transfer units 100 to 106 has a carrier plate 108 which is supported on the chassis 81 of the second transport means 80. These carrier plates 108 are mounted separately from each other and can be moved separately and independently in the horizontal direction X.

In another variant, the transfer units 100 to 106 can be mounted on a common carrier plate and be moved only together. In general, a number of carrier plates 108 can be provided which can be positioned next to each other in the longitudinal direction X or in the transverse direction Y and which can be moved, either independently or as a group, in the longitudinal direction X and/or in the transverse direction Y. It is also possible, for example, to have two transfer units supported on one carrier plate 108 and for them to move together. Furthermore each transfer unit 100 to 106 is provided with a drive which can be separately controlled and moved.

As can be seen in particular in FIGS. 2 and 6, each drive is made up of two drive units each of these comprising one chain 114 and two drive shafts 116. On each chain 114 there is at least one carriage 117 to enable the containers to be gripped. Preferably, the carriages 117 should engage in corresponding grooves in the support bars 58 of the containers.

In other words, in each case two drive units take hold of one container 50 to 53 in order to pull the container from the operating surface of the operating hatch 30 onto the carrier plate 108 of the corresponding transfer unit 100 to 106. The transfer unit 100 to 106 then moves the containers 50 to 53 simultaneously in the transverse direction Y.

After the containers 50 to 53 have been collected from the operating hatch 30 by the transfer device 90, the containers 50 to 53 can be moved along the transport shaft only by means of the transport device 60 in the longitudinal direction X and the vertical direction Z. Once the position allocated by the control unit has been reached, the transfer units 100 to 106 push the containers 50 to 53 into the storage spaces 24 to 27 (see FIG. 3).

After the containers 50 to 53 have been placed into the storage spaces 24 to 27, this action can be followed directly by the removal of the containers 54, 55, 56, 57 (see FIG. 3). After the transport device 60 has moved to the height of the containers 54, 55, the transfer device 90 pulls the two containers 54, 55 simultaneously with the help of the transfer units 100 and 102 from the storage spaces onto the second transport means 80. The first transport means 70 then moves downwards in a vertical direction Z, until the transport device 60 reaches the height of the containers 56, 57, and there, with the help of the transfer units 104 and 106, it draws the two other containers 56, 57 from the storage spaces onto the second transport means 80.

Subsequently, the transport device 60 moves to the height of the operating hatch 30 whilst the second transport means 80 is positioned in the longitudinal direction X in such a way that all four containers 54 to 57 can be pushed simultaneously into the operating hatch 30.

The pulling and pushing of the containers 54 to 57 is performed in the same way as in the process explained above for placing the containers 50 to 53 into stock with the help of the drive units of the transfer units 100 to 106, i.e. by means of the chain drives as the gripping/pulling units.

The embodiment described is characterised in particular by the faster access times achieved in the placing of a number of containers, 50 to 53 or 54 to 57, into stock and their removal from stock, i.e. the shorter times for storage and retrieval. It is particularly preferred that containers can be supplied to the operating hatch 30 simultaneously or that they can be placed from here into stock simultaneously. What is more, the transfer device 90 can be configured in a modular way by the addition or removal of individual transfer units and in this way can be adapted to the flexibly changeable capacity of the storage rack 10. In the event that the storage units 20, 22 are added or removed and that the first transport means 70 is adapted in modular fashion by means of the carrier modules/transport-means modules 73, the number of transfer units can be varied in accordance with these so that an optimal operation of the storage rack can be achieved.

In the example of an embodiment given above, all four transfer units 100 to 106 are supported on the second transport means 80 and thus can be moved together in the longitudinal direction X on the first transport means 70. In principle, however, a group of transfer units, for example two transfer units, can be movably positioned on the second transport means 80 quite separately from another group of transfer units.

By virtue of the embodiment explained above with the transfer device 90 having a number of transfer units 100 to 106, a group of a number of containers 50 to 53, in particular four containers, can be placed into the storage spaces or removed from them simultaneously. In this way it is possible either to place all four containers 50 to 53 into neighbouring storage units at one horizontal level, or first of all to place one group of e.g. two containers in two storage spaces neighbouring or at a distance from each other on the same level and, in a second step, to place a second group of two containers in storage spaces neighbouring or at a distance from each other on a second level.

Finally, containers 50 to 57 of different heights can be used because the side walls 12 are preferably designed with a grid-like pattern and suitable storage spaces can be determined with the help of the height-measurement device described above. Furthermore, the containers 50 to 57 can be transported without any additional load carriers. In the preferred embodiment, the simultaneous storage and retrieval of four containers 50 to 53 or 54 to 57 is possible. The containers 50 to 57 that are used can be conventional small-component carriers and, as appropriate, have different heights and e.g. can hold up to 50 kg of load.

LIST OF REFERENCE SIGNS 10 storage rack
12 side wall
14 stanchion
16 container support
17 groove
18 front surface
19 wheel
20 rack unit
22 rack unit
24 storage location
25 storage location
26 storage location
27 storage location
30 operating hatch
40 height-measuring device
42 photoelectric beam
50 container
51 container
52 container
53 container
54 container
55 container
56 container
57 container
58 support bar
59 side (of container)
60 transport device
70 first transport means
71 carrier
72 carrier
73 carrier module
74 transverse carrier
75 stiffening element
76 strut
77 pre-tensioning element
78 pre-tensioning module
79 tensioner
80 second transport means
81 chassis
82 wheel
83 wheel
90 transfer device
100 transfer unit
102 transfer unit
104 transfer unit
106 transfer unit
108 carrier plate
110 chain
112 drive shaft
114 chain
116 drive shaft
117 carriage
120 toothed rack
121 toothed-rack module
122 pinion
123 motor
X first horizontal direction/longitudinal direction
Y second horizontal direction/transverse direction
Z vertical direction

The invention claimed is:

1. A storage unit comprising:
a plurality of rack units each having a plurality of container supports spaced one above the other, said supports being disposed in pairs on opposite side walls of the rack units to form storage locations for containers;
a controllable transport device comprising at least one lifting platform supported between first and second vertical drivers and extending in a direction X with reference to a set of orthogonal coordinates X, Y, Z, past a plurality of said storage locations and moveable in a vertical direction Z and a chassis supported on the lifting platform and movable in a first horizontal direction X along the lifting platform past the plurality of storage locations, for placing containers in or removing containers from the storage locations,
a transfer device comprising at least one carrier plate arranged on the chassis and further comprising a plurality of transfer units mounted on the at least one carrier plate and arranged side-by-side along the first horizontal direction X direction for placing the containers into and removing them from stock along a second horizontal direction Y relative to the lifting platform and relative to the chassis,
wherein each transfer unit can be associated with one container and each transfer unit can be controlled and operated separately for moving individual containers into and out of the storage locations along the second horizontal direction Y successively or simultaneously with similar movements of other individual containers associated with other of the transfer units for moving the containers into and out of the storage locations, and
a control unit that identifies a neighbouring area of the storage rack containing a number of storage locations corresponding to the number of containers associated with the transfer units, and
the controllable transport device being controllable for simultaneously moving the number of containers individually associated with the transfer units to the identified neighbouring area of the storage rack.

2. Storage unit according to claim 1 wherein the lifting platform comprises a number of modules joined to each other detachably.

3. Storage unit according to claim 1 wherein the plurality of transfer units are detachable from and connectable to one another in a modular fashion for varying the number of the transfer units.

4. Storage unit according to claim 3 wherein the at least one carrier plate includes a plurality of carrier plates and each of the transfer units, is separately mounted on one of the plurality of carrier plates.

5. Storage unit according to claim 4 wherein each of the transfer units comprises a pair of drives mounted on one of the carrier plates.

6. Storage unit according to claim 1 wherein each of the transfer units includes a pair of drives mounted on the at least one carrier plate for moving the containers in the second horizontal direction Y into and out of the storage locations.

7. Storage unit according to claim 1 wherein the transfer units are arranged to be able to place the containers into stock or to remove them at least in groups synchronously or successively.

8. The storage unit of claim 7 in which the transfer units comprise gripping units.

9. Storage unit according to claim 1 comprising at least one operating hatch extending in the Y direction through one of the plurality of rack units for submitting and retrieving the containers.

10. Storage unit according to claim 9 comprising a height-measuring device for measuring a height of the containers proximate to the operating hatch.

11. Storage unit according to claim 9 wherein the operating hatch is dimensioned in such a way that containers can be placed into and/or removed from stock simultaneously.

12. Storage unit according to claim 9 comprising a shutter device proximate to the operating hatch for opening and closing the operating hatch.

13. Storage unit according to claim 1 wherein the container supports are provided in a grid-like array on the side walls.

14. Storage unit according to claim 1 wherein the container supports are pressed in a meandering shape into the side walls.

15. Storage unit according to claim 1 wherein the container supports have grooves into and out of which support bars of the containers can be guided.

16. Storage unit according to claim 1 wherein the lifting platform, the chassis and/or the transfer units can be moved by means of a rack and pinion drive and/or a chain drive.

* * * * *

UNITED STATES PATENT AND TRADEMARK OFFICE
CERTIFICATE OF CORRECTION

| | | |
|---|---|---|
| PATENT NO. | : 8,920,098 B2 | Page 1 of 1 |
| APPLICATION NO. | : 12/675328 | |
| DATED | : December 30, 2014 | |
| INVENTOR(S) | : Joachim Hänel | |

It is certified that error appears in the above-identified patent and that said Letters Patent is hereby corrected as shown below:

On the title page, item (73), change the assignee's city from "Altseätten" to -- Altstätten --.

Signed and Sealed this
Second Day of June, 2015

Michelle K. Lee
*Director of the United States Patent and Trademark Office*